(12) United States Patent
Okino (10) Patent No.: US 8,804,774 B2
(45) Date of Patent: Aug. 12, 2014

(54) RADIO COMMUNICATION APPARATUS AND RADIO COMMUNICATION METHOD

(75) Inventor: Kenta Okino, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 112 days.

(21) Appl. No.: 13/504,894

(22) PCT Filed: Oct. 28, 2010

(86) PCT No.: PCT/JP2010/069126
§ 371 (c)(1),
(2), (4) Date: Apr. 27, 2012

(87) PCT Pub. No.: WO2011/052662
PCT Pub. Date: May 5, 2011

(65) Prior Publication Data
US 2012/0218944 A1     Aug. 30, 2012

(30) Foreign Application Priority Data

Oct. 29, 2009 (JP) ................................ 2009-249319

(51) Int. Cl.
*H04J 3/26* (2006.01)
(52) U.S. Cl.
USPC .......................................... 370/535; 714/749
(58) Field of Classification Search
CPC ................................... H04J 3/26; H04L 1/1887
USPC ......... 370/328, 329, 330, 535–538, 240, 241, 370/244, 468; 714/746–749, 48; 375/147, 375/240.05, 240.27
See application file for complete search history.

(56) References Cited

U.S. PATENT DOCUMENTS

| 7,486,642 | B2 * | 2/2009 | Kim et al. ..................... 370/332 |
| 8,107,547 | B2 * | 1/2012 | Muharemovic et al. ...... 375/260 |
| 8,149,769 | B2 * | 4/2012 | Lee et al. ...................... 370/328 |
| 2009/0274100 | A1 * | 11/2009 | Montojo et al. ............... 370/328 |

FOREIGN PATENT DOCUMENTS

JP     2009-188660 A     8/2009

OTHER PUBLICATIONS

3GPP TS 36.211 V8.6.0 (Mar. 2009); "3rd Generation Partnership Project; Technical Specification Group Radio Access Network; Evolved Universal Terrestrial Radio Access (E-ULTRA); Physical Channels and Modulation (Release 8)".
International Search Report; PCT/JP2010/069126; Nov. 30, 2010.

* cited by examiner

*Primary Examiner* — Hanh N Nguyen
(74) *Attorney, Agent, or Firm* — Studebaker & Brackett PC (57) ABSTRACT

Disclosed is a radio base station (100) provided with: a reception unit (111) that receives, from a radio terminal, a reference signal multiplexed with an ACK or a NACK; an ACK/NACK detection unit (121) that detects the ACK or NACK multiplexed onto the reference signal, using a detection criterion (1) set such that the ACK false-positive rate is lower than the NACK false-positive rate; an ACK/NACK detection unit (123) that detects the ACK or NACK multiplexed onto the reference signal, using a detection criterion (2) set such that the relationship between the ACK false-positive rate and the NACK false-positive rate is different from that in the detection criterion (1); a transmission/retransmission control unit (122) that controls retransmission of data in accordance with the detection result from the ACK/NACK detection unit (121); and a channel estimation unit (124) that performs channel estimation using the reference signal from which the ACK/NACK is removed in accordance with the detection result from the ACK/NACK detection unit (123).

6 Claims, 4 Drawing Sheets

RADIO COMMUNICATION APPARATUS AND RADIO COMMUNICATION METHOD

TECHNICAL FIELD

The present invention relates to a radio communication apparatus and a radio communication method which perform channel estimation using a reference signal received from a radio communication counterpart.

BACKGROUND ART

Recently, in order to respond to a demand for an increase in speed and capacity of mobile communications systems, standardizations of E-UTRA (Evolved-Universal Terrestrial Radio Access) have been conducted in the 3GPP (3rd General Partnership Project) which is a standardization project for mobile communications systems.

In the E-UTRA, a radio base station receives control information such as CQI (Channel Quality Information) and ACK (Acknowledgement)/NACK (Negative Acknowledgement) from a radio terminal via PUCCH (Physical Uplink Control Channel) (see, Non-patent Document 1).

Here, the CQI is control information indicating a receiving quality (for example, SINR) which is measured by a radio terminal. The ACK is control information indicating that data received by a radio terminal has been successfully decoded, while the NACK is control information indicating that data received by a radio terminal has failed to be decoded. In the following description, "ACK or NACK" is referred to as "A/N" if needed. The A/N is used for data retransmission control (specifically, retransmission control in a layer 2).

When CQI transmission and A/N transmission compete with each other within the same sub-frame in PUCCH, a radio terminal performs the transmissions by multiplexing a reference signal within the sub-frame with the A/N. The reference signal is a signal sequence for a radio base station to estimate a channel characteristic between the radio base station and a radio terminal. The radio base station detects A/N multiplexed in the reference signal, removes the A/N from the reference signal depending on a result of detection, and performs channel estimation using the reference signal from which the A/N is removed. The estimated channel characteristic is used for demodulation of CQI within the sub-frame.

PRIOR ART DOCUMENT

Non-Patent Document

Non-patent Document 1: 3GPP, TS36.211, v8.6.0, "Evolved Universal Terrestrial Radio Access (E-UTRA); Physical Channels and Modulation (Release 8)

SUMMARY OF THE INVENTION

In a case where NACK is wrongly detected as ACK when A/N multiplexed in a reference signal is detected, retransmission in a layer 2 which is normally supposed to be performed is not performed. As a result, retransmission is caused in a layer higher than the layer 2, which results in a large delay. Suppressing such occurrence of a large delay requires that NACK is more accurately detected using a detection criterion in which a false detection rate of NACK becomes lower than a false detection rate of ACK.

However, using the detection criterion in which the false detection rate of NACK becomes lower than the false detection rate of ACK causes the false detection rate of ACK to be relatively high. For this reason, when an occurrence rate of ACK is higher than an occurrence rate of NACK, a high false detection rate of ACK often causes the false detections of both ACK and NACK. Under a situation where such false detections are often caused, a probability of a process to falsely remove the A/N from the reference signal increases, thereby decreasing an accuracy of channel estimation. A decrease in the accuracy of channel estimation leads to a problem that a demodulation performance for CQI is also decreased.

Accordingly, an objective of the present invention is to provide a radio communication apparatus and radio communication method which can suppress occurrence of delay by retransmission in an upper layer and maintain a demodulation performance for CQI.

The present invention has the following features to solve the problems described above. A first feature of a radio communication apparatus according to the present invention is summarized as follows. A radio communication apparatus (e.g. radio base station 100) configured to receive a reference signal multiplexed with an acknowledgement (ACK) or a negative acknowledgement (NACK) from a radio communication counterpart (e.g. radio terminal 200), the acknowledgement indicating that data received by the radio communication counterpart is successfully decoded, the negative acknowledgement indicating that data received by the radio communication counterpart fails to be decoded, comprises: a first detector (A/N detector 121) configured to detect the acknowledgement or negative acknowledgement multiplexed in the reference signal using a first detection criterion set (detection criterion 1) such that a false detection rate of the acknowledgement becomes lower than a false detection rate of the negative acknowledgement; a second detector (A/N detector 123) configured to detect the acknowledgement or negative acknowledgement multiplexed in the reference signal using a second detection criterion set (detection criterion 2) such that a relative relationship between the false detection rate of the acknowledgement and the false detection rate of the negative acknowledgement becomes different from a relative relationship of the first detection criterion; a retransmission controller (transmission/retransmission controller 122) configured to perform retransmission control of data to the radio communication counterpart according to a result of detection made by the first detector; and a channel estimation unit (channel estimation unit 124) configured to estimate a channel characteristic (e.g. channel response) with the radio communication counterpart using the reference signal from which the acknowledgement or negative acknowledgement is removed according to a result of detection made by the second detector.

Such a radio communication apparatus has the first detector configured to detect acknowledgement/negative acknowledgement (A/N) for retransmission control and the second detector configured to detect A/N for channel estimation.

The first detector can detect NACK more accurately because the first detector detects A/N using the first detection criterion set such that a false detection rate of NACK would be lower than a false detection rate of ACK. This can suppress occurrence of retransmission in a layer higher than the layer 2.

The second detector can avoid the case that the false detection rate of ACK is increased with the first detection criterion, because the second detector detects A/N using the second detection criterion set such that a relative relationship between the false detection rate of acknowledgement and the false detection rate of negative acknowledgement would be different from that of the first detection criterion. Accordingly, the accuracy of channel estimation does not decrease and the demodulation performance for CQI can be maintained.

Thus, the radio communication apparatus according to the first feature can suppress occurrence of delay by retransmission of an upper layer and maintain a demodulation performance for CQI.

A second feature of a radio communication apparatus according to the present invention is related to the first feature and is summarized as follows. The second detection criterion is set such that the false detection rate of the acknowledgement and the false detection rate of the negative acknowledgement become equal to each other.

A third feature of a radio communication apparatus according to the present invention is related to the first feature and is summarized as follows. In the second detection criterion, the relative relationship between the false detection rate of the acknowledgement and the false detection rate of the negative acknowledgement is determined according to an occurrence rate of each of the acknowledgement and the negative acknowledgement.

A fourth feature of a radio communication apparatus according to the present invention is related to the third feature and is summarized as follows. When the occurrence rate of the acknowledgement is higher than the occurrence rate of the negative acknowledgement, the second detection criterion is set such that the false detection rate of the acknowledgement becomes lower than the false detection rate of the negative acknowledgement.

A fifth feature of a radio communication apparatus according to the present invention is related to the third feature or the fourth feature and is summarized as follows. The radio communication apparatus further comprises a transmission controller (transmission/retransmission controller 122) to control transmission of data to the radio communication counterpart so that a probability (e.g. packet error rate) of the radio communication counterpart failing to decode data becomes a specified value (e.g. 10%), wherein the occurrence rate of each of the acknowledgement and negative acknowledgement is set according to the specified value.

A sixth feature of a radio communication apparatus according to the present invention is summarized as follows. A radio communication method comprises the steps of: receiving (step S101) a reference signal multiplexed with an acknowledgement or a negative acknowledgement from a radio communication counterpart, the acknowledgement indicating that data received by the radio communication counterpart is successfully decoded, the negative acknowledgement indicating that data received by the radio communication counterpart fails to be decoded; detecting (step S102) the acknowledgement or negative acknowledgement multiplexed in the reference signal using a first detection criterion set such that a false detection rate of the acknowledgement becomes lower than a false detection rate of the negative acknowledgement; detecting (step S104) the acknowledgement or negative acknowledgement multiplexed in the reference signal using a second detection criterion set such that a relative relationship between the false detection rate of the acknowledgement and the false detection rate of the negative acknowledgement becomes different from a relative relationship of the first detection criterion; performing (step S103) retransmission control of data to the radio communication counterpart according to a result of detection using the first detection criterion; and estimating (step S105) a channel characteristic with the radio communication counterpart using the reference signal from which the acknowledgement or negative acknowledgement is removed according to a result of detection using the second detection criterion.

The present invention can provide a radio communication apparatus and radio communication method which can suppress occurrence of delay by retransmission of an upper layer and maintain a demodulation performance for CQI.

DESCRIPTION OF THE EMBODIMENTS

Hereinafter, a radio base station which is an embodiment of a radio communication apparatus according to the present invention is described with reference to the drawings. Specifically, description is made for (1) Outline of Radio Communication System, (2) Configuration of Radio Base Station, (3) Detection Criterion 1 and Detection Criterion 2, (4) Operation of Radio Base Station, (5) Advantageous Effects, and (6) Other Embodiments.

In the following description of the drawings, same or similar reference numerals are given to denote same or similar portions.

(1) Outline of Radio Communication System

First of all, a radio communication system which uses a radio base station according to an embodiment of the present invention is described. In the embodiment, the radio communication system is E-UTRA standardized by 3GPP.

(1.1) Entire Schematic Configuration

Figure 1:
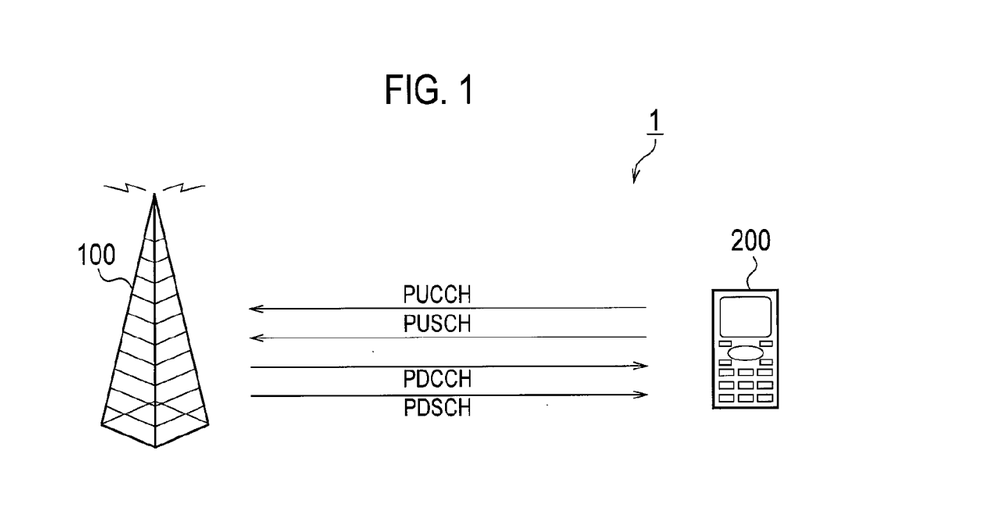
FIG. 1 is an entire schematic configuration diagram of a radio communication system according to an embodiment of the present invention.

FIG. 1 is an entire schematic configuration diagram of a radio communication system 1. As shown in FIG. 1, the radio communication system 1 has a radio base station 100 and a radio terminal 200. The radio terminal 200 is located within a cell which is formed by the radio base station 100 and performs radio communications with the radio base station 100. Note that in FIG. 1, only one radio terminal 200 is illustrated but a plurality of radio terminals 200 is also possible.

In a downlink between the radio base station 100 and the radio terminal 200, PUCCH (Physical Downlink Control Channel) in which control information is transmitted and PDSCH (Physical Downlink Shared Channel) in which user data is transmitted are established.

In an uplink between the radio base station 100 and the radio terminal 200, PUCCH in which control information is transmitted and PUSCH (Physical Uplink Shared Channel) in which user data is transmitted are established. The following description of the embodiment is mainly given to the PUCCH.

A PUSCH transmission method employs SC-FDMA (Single-Carrier-Frequency Division Multiple Access) capable of creating a transmission signal with a small peak-to-average power ratio in terms of expanding a coverage and providing the radio terminal 200 with a lower power consumption. The PUSCH adopts adaptive modulation coding according to a channel quality between the radio base station 100 and the radio terminal 200. Note that PDSCH also adopts adaptive modulation coding according to a channel quality between the radio base station 100 and the radio terminal 200.

A PUCCH transmission method employs CDMA (Code Division Multiple Access) using an orthogonal sequence. The control information which is transmitted in the PUCCH includes the above-described CQI, A/N, and the like.

Figure 2:
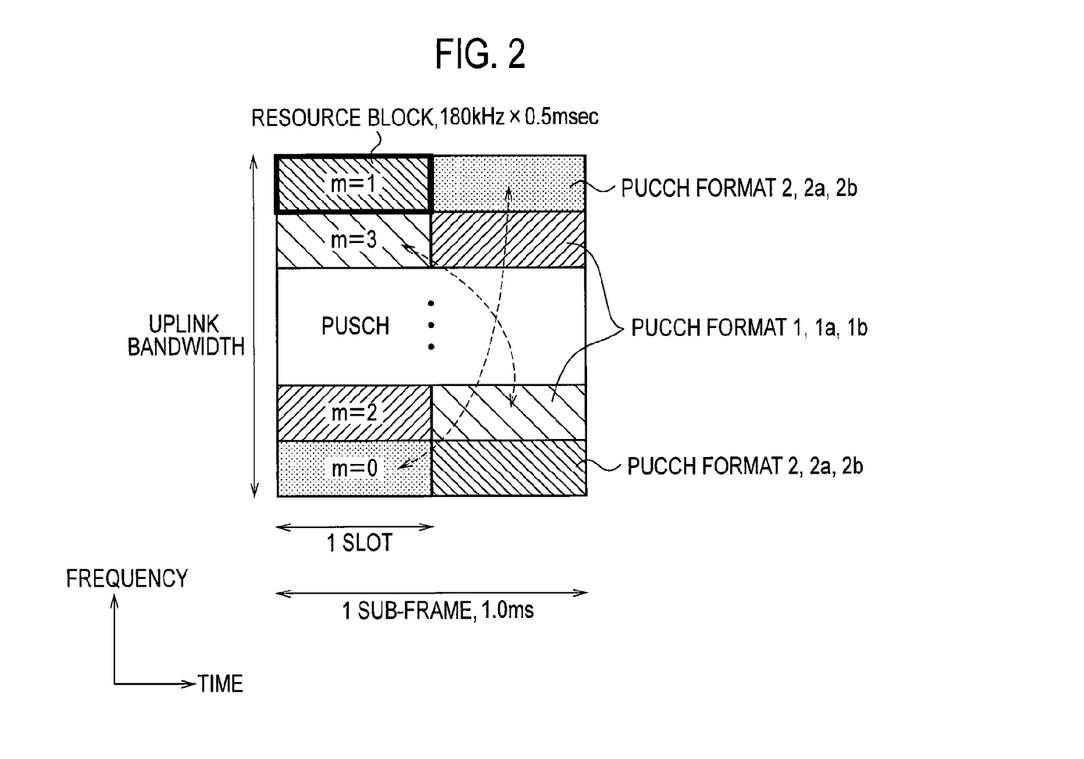
FIG. 2 is a drawing showing a sub-frame configuration in an uplink of E-UTRA.

FIG. 2 is a drawing showing a sub-frame configuration in an uplink of E-UTRA. The sub-frame is configured of two slots (time slots), and each slot is configured of resource blocks (frequency bands) the number of which corresponds to the uplink bandwidth of a cell. The resource block (hereinafter, RB) is configured of 12 sub-carriers and 7 SC-FDMA symbols (in the case of Normal CP (Cyclic Prefix) setting). One PUCCH resource uses 1 RB of each of the two slots within a sub-frame. At this time, frequency hopping using both ends of the uplink band is adopted between the slots within the sub-frame.

(1.2) PUCCH

The PUCCH supports a plurality of formats and different pieces of control information are transmitted in the respective formats. Of these formats, a format in which CQI and A/N can be transmitted within the same sub-frame is referred to as a format 2a/2b (a, b respectively correspond to 1, 2 code word). In the present embodiment, with an assumption of the 1 code word in which spatial multiplexing is not performed in PDSCH, the format 2a is mainly described.

Figure 3:
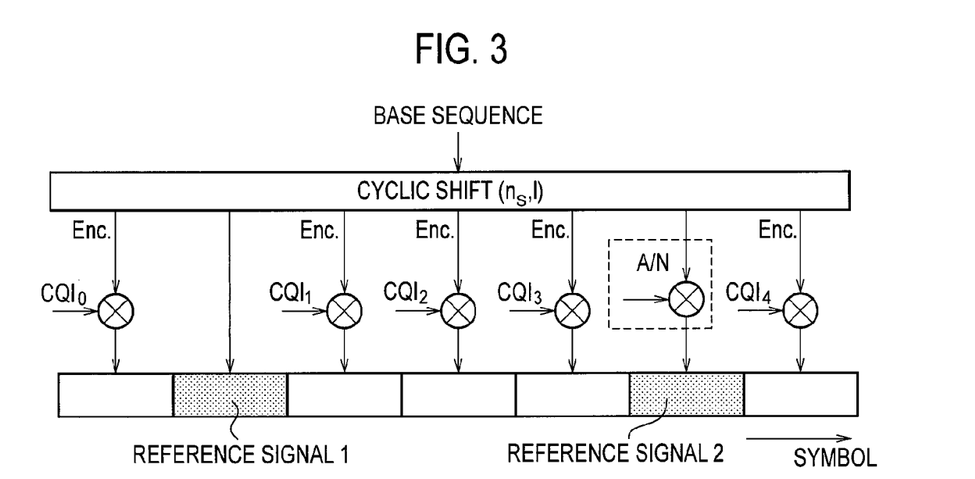
FIG. 3 is a drawing for illustrating a channel configuration of a PUCCH format.

FIG. 3 is a drawing for illustrating a channel configuration of a PUCCH format 2a.

The number of bits of CQI depends on a report mode in a channel state. The CQI is coded to 20 bits by a block code formed of 13 base sequences. A coded bit sequence is QPSK (Quadrature Phase Shift Keying) modulated after being scrambled and is diffused in the RB bandwidth for each symbol by a sequence with a cyclic shift length of 12.

Multi-access from up to 12 radio terminals is possible per a PUCCH resource. However, when a multi-access interference needs to be decreased, a resource is assigned in consideration of a cyclic shift interval. The same cyclic shift sequence is applied to reference signals 1, 2 for demodulation of PUCCH modulation (specifically, for demodulation of CQI), and is allocated in the second and sixth symbol of each RB.

The A/N is one-bit information and BPSK (Binary Phase Shift Keying) modulated, and as shown by a dashed line in FIG. 3, is multiplexed in the second reference signal 2.

(2) Configuration of Radio Base Station

Figure 4:
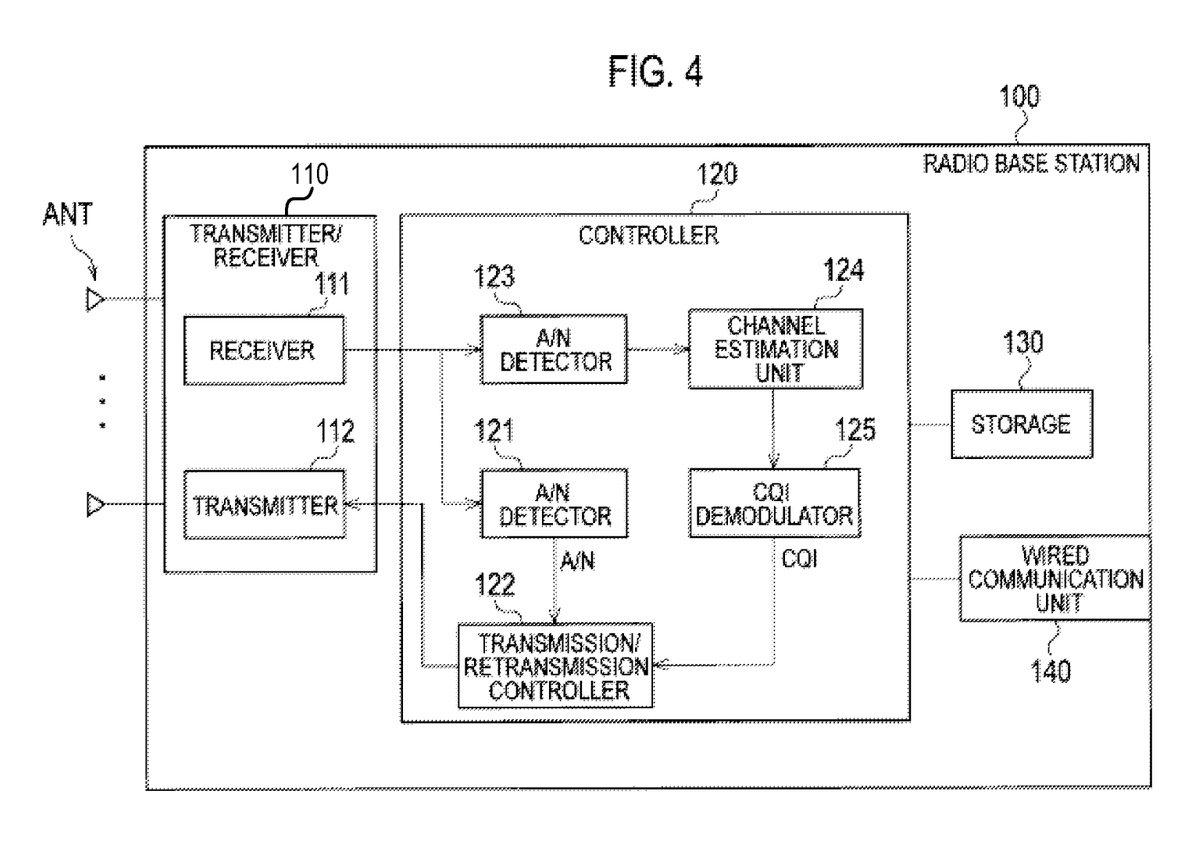
FIG. 4 is a block diagram showing a configuration of a radio base station according to the embodiment of the present invention.

Hereinafter, the configuration of the radio base station 100 is described. FIG. 4 is a block diagram showing the configuration of the radio base station 100. As shown in FIG. 4, the radio base station 100 has an antenna ANT, a transmitter/receiver 110, a controller 120, a storage 130, and a wired communication unit 140.

The transmitter/receiver 110 is configured using, for example, a radio frequency (RF) circuit and a base band (BB) circuit, and transmits/receives a radio signal via the antenna ANT. A plurality of antennas ANT is connected to the transmitter/receiver 110 for executing SIMO (Single Input Multiple Output) or MIMO (Multiple Input Multiple Output) communications with the radio terminal 200.

The transmitter/receiver 110 has a receiver 111 to amplify and down-convert a signal received by the antenna ANT and a transmitter 112 to amplify and up-convert a signal to be transmitted. The receiver 111 performs reception processing required for performing demodulation processing of PUCCH on the signal received by the antenna ANT. The receiver 111 receives a reference signal multiplexed with A/N and CQI via the PUCCH.

The controller 120 is configured using, for example, CPU and controls every kinds of functions included in the radio base station 100. The storage 130 is configured using, for example, a memory, and stores every pieces of information to be used for control in the radio base station 100. The wired communication unit 140 executes a wired communication with other network devices via a backhaul network.

The controller 120 has an A/N detector 121, a transmission/retransmission controller 122, an A/N detector 123, a channel estimation unit 124, and a CQI demodulator 125. In the embodiment, the A/N detector 121 corresponds to a first detector. The A/N detector 123 corresponds to a second detector. The transmission/retransmission controller 122 corresponds to a retransmission controller and a transmission controller.

The A/N detector 121 detects A/N multiplexed in the reference signal received by the receiver 111 via the PUCCH using a detection criterion 1 set such that a false detection rate of NACK would be lower than a false detection rate of ACK. The detection criterion 1 is described later in detail.

The transmission/retransmission controller 122 performs retransmission control of data to the radio terminal 200 according to a result of detection made by the A/N detector 121. For example, the transmission/retransmission controller 122 performs retransmission of data corresponding to NACK when NACK is detected by the A/N detector 121, and does not perform retransmission when ACK is detected by the A/N detector 121.

Also, the transmission/retransmission controller 122 may control transmission of data to the radio terminal 200 so that a probability of the radio terminal 200 failing to decode data (for example, a packet error rate) would be a specified value (for example, 10%). Specifically, the transmission/retransmission controller 122 maintains the packet error rate at the specified value by performing the adaptive modulation coding which dynamically switches a modulation method and code rate of data to be transmitted to the radio terminal 200, based on the CQI and the like.

The A/N detector 123 detects A/N multiplexed in the reference signal received by the receiver 111 via the PUCCH using a detection criterion 2 set such that a relative relationship between the false detection rate of ACK and the false detection rate of NACK would be different from that of the detection criterion 1.

The detection criterion 2 may be set such that the false detection rate of ACK and the false detection rate of NACK would be equalized or may be set according to the specified value of the packet error rate. In the case where an occurrence rate of ACK and an occurrence rate of NACK are indefinite, it is preferable that the detection criterion 2 be set such that a false detection rate of ACK and a false detection rate of NACK would be equalized. In the case where the adaptive modulation coding is performed so that the packet error rate would be a specified value, the occurrence rate of ACK and the occurrence rate of NACK are fixed. Thus, it is preferable that the detection criterion 2 be set according to the specified value of the packet error rate. The details of the case where the detection criterion 2 is set according to the specified value of the packet error rate are described later.

The channel estimation unit 124 estimates a channel characteristic with the radio terminal 200 (specifically, an uplink channel response) using the reference signal from which A/N is removed according to the result of detection made by the A/N detector 123. To remove A/N means here the process to return the phase of the reference signal to the original one because the phase of the reference signal is modulated according to the A/N. The A/N may be removed by the A/N detector 123 or the channel estimation unit 124.

The CQI demodulator 125 performs demodulation processing of CQI received by the receiver 111 via the PUCCH using a channel response estimated in the channel estimation unit 124. The CQI acquired by the demodulation processing is used for the adaptive modulation coding in the transmission/retransmission controller 122 or is used for radio resource assignment processing (scheduling) to the radio terminal 200.

(3) Detection Criterion 1 and Detection Criterion 2

Hereinafter, specific examples of detection criterion 1 and detection criterion 2 are described. Here, shown as an example is a case where adaptive modulation coding is performed so that a downlink packet error rate would be a specified value.

(3.1) Detection Criterion 1

The detection criterion 1 in the A/N detector 121 for retransmission control is set such that a false detection rate of NACK would be lower than a false detection rate of ACK in order to suppress occurrence of delay by retransmission in an upper layer. As one example, the detection criterion 1 is set such that a false detection rate of ACK would be 1% and a false detection rate of NACK would be 0.01% with respect to a required receiving SINR.

For example, under a channel environment where a channel response within a resource block can be regarded as constant, the first reference signal 1 (see FIG. 3) after back diffusion by a code sequence is expressed by the formula (1).

[Formula 1]

$$r_1 = h_m + n_1 \quad (1)$$

Here, $h_m$ is a channel response between the radio terminal 200 and the radio base station 100 and $n_1$ is noise.

On the other hand, since the second reference signal 2 (see FIG. 3) is multiplexed with A/N information, it is expressed by the formula (2).

[Formula 2]

$$r_2 = h_m s + n_2 \quad (2)$$

Here, $n_2$ is noise and s is a signal which is BPSK-modulated based on the A/N information to be transmitted.

Channel estimation values of the two reference signals 1, 2 are added and averaged, so that noise is suppressed and a channel estimation accuracy can be expected to be improved. However, in order to add them in the same phase, s has to be detected beforehand.

An example of a detection method in the A/N detector 121 is described. First of all, the A/N detector 121 calculates as the formula (3), assumed that $y_1$ is power in which the two receiving reference signals are added and $y_2$ is power in which they are added in reverse phases.

[Formula 3]

$$y_1 = \left|\frac{r_1 + r_2}{2}\right|^2 \quad (3)$$
$$= \left|\frac{h_m(1+s) + n_1 + n_2}{2}\right|^2,$$

$$y_2 = \left|\frac{r_1 - r_2}{2}\right|^2$$
$$= \left|\frac{h_m(1-s) + n_1 - n_2}{2}\right|^2$$

It can be determined that when $y_1$ is larger, ACK (S=−1) is transmitted and when $y_2$ is larger, NACK (S=1) is transmitted.

Here, considering a case where ACK is transmitted (S=−1), expectation values of $y_1$ and $y_2$ can be expressed by the formula (4).

[Formula 4]

$$E[y_1] = E\left[\left|\frac{n_1 + n_2}{2}\right|^2\right] = \frac{N}{2}, \quad (4)$$
$$E[y_2] = E\left[\left|\frac{2h_m + n_1 + n_2}{2}\right|^2\right] = |h_m|^2 + \frac{N}{2}$$

On the other hand, even considering a case where NACK is transmitted (S=1), the expectations values of $y_1$ and $y_2$ are just replaced by each other, and the false detection rate of ACK and the false detection rate of NACK become equal to each other.

For this reason, $y_1$ is multiplexed by a compensation coefficient $\alpha_1$ like the formula (5) so that the false detection rate of ACK would be 1% and the false detection rate of NACK would be 0.01%.

[Formula 5]

$$\begin{cases} y_1' = \alpha_1 y_1 \\ y_2' = y_2 \end{cases} \quad (5)$$

Setting a proper $\alpha_1$ larger than 1, the false detection rate of NACK is decreased. Thus, a desired characteristic can be obtained.

The A/N detector 121 detects that when $y_1'$ is larger, ACK (S=−1) has been transmitted and when $y_2'$ is larger, NACK (S=1) has been transmitted.

(3.2) Detection Criterion 2

It is better to set the detection criterion 2 in the A/N detector 123 for channel estimation so that false detection rates of both ACK and NACK would be small in order to enhance a probability of correctly performing channel estimation in the channel estimation unit 124.

In other words, in the detection criterion 2, a relative relationship between the false detection rate of ACK and the false detection rate of NACK is determined according to an occurrence rate of each of ACK and NACK. When the occurrence rate of ACK is higher than the occurrence rate of NACK, the detection criterion 2 is set such that the false detection rate of ACK would be lower than the false detection rate of NACK.

For example, assumed that the adaptive modulation coding is performed so that a downlink packet error rate would be 10%, a ratio of ACK and NACK which are transmitted from the radio terminal 200 becomes 9:1. Accordingly, for example, in the required receiving SINR fulfilling that the false detection rate of ACK is 1% and the false detection rate of NACK is 0.01% as described above, a complementary coefficient $\alpha_2$ is set in place of the complementary coefficient $\alpha_1$ in the formula (5) so that a ratio of the false detection rate of ACK and the false detection rate of NACK would be 1/9.

Then, the A/N detector 123 detects that when $y_1'$ is larger, ACK (S=−1) has been transmitted and when $y_2'$ is larger, NACK (S=1) has been transmitted.

(4) Operation of Radio Base Station

Figure 5:
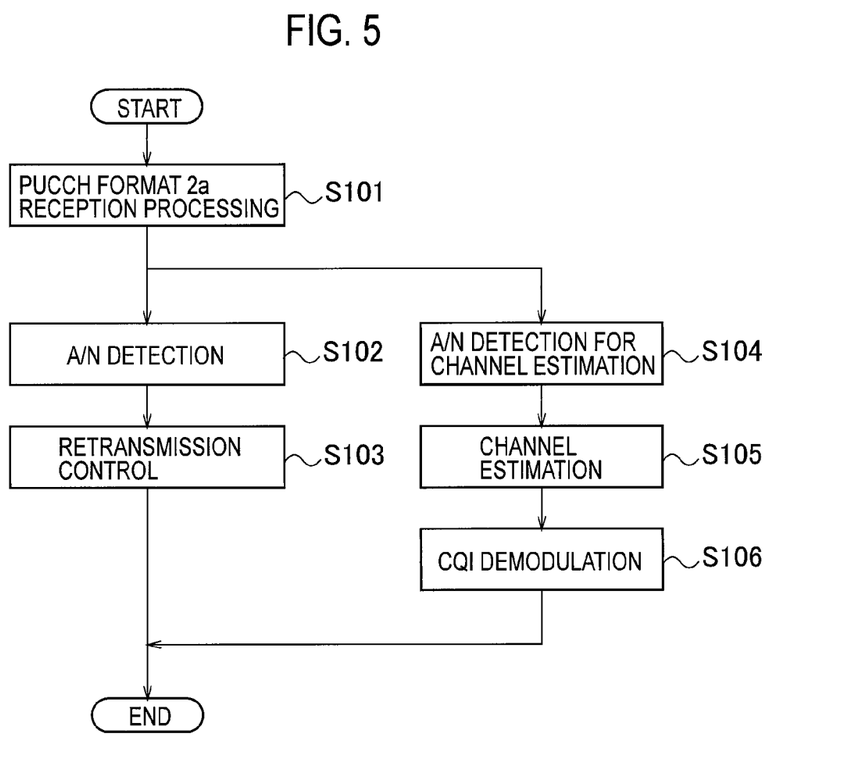
FIG. 5 is a flowchart showing an operation of the radio base station according to the embodiment of the present invention.

FIG. 5 is a flowchart showing an operational example of the radio base station 100.

At step S101, the receiver 111 receives a reference signal multiplexed with A/N and CQI by a PUCCH format 2a and performs reception processing needed for demodulating these reference signal and CQI.

At step S102, the A/N detector 121 detects A/N multiplexed in the reference signal using the detection criterion 1. For example, to detect A/N, the A/N detector 121 calculates $y_1$ and $y_2$ according to the formula (3) and multiplexes $y_2$ by a complementary coefficient $\alpha_1$ and compares them with $y_1'$ and $y_2'$.

At step S103, the transmission/retransmission controller 122 performs retransmission control of data to the radio terminal 200 according to a result of detection made by the A/N detector 121.

On the other hand, at step S104, the A/N detector 123 detects A/N multiplexed in the reference signal using the detection criterion 2. For example, to detect A/N, the A/N detector 123 calculates $y_1$ and $y_2$ according to the formula (3) and multiplexes $Y_1$ by a complementary coefficient $\alpha_2$, and compares then with $y_1'$ and $y_2'$. Note that to reduce throughput, the calculation of $y_1$ and $y_2$ may be used in common by the A/N detector 121 and the A/N detector 123.

At step S105, the channel estimation unit 124 estimates an uplink channel response with the radio terminal 200 using the reference signal from which A/N is removed according to the result of detection made by the A/N detector 123.

At step S106, the CQI demodulator 125 performs demodulation processing of CQI using the channel response estimated by the channel estimation unit 124.

(5) Advantageous Effects

As described above, the radio base station 100 has an A/N detector 121 configured to detect A/N for retransmission and an A/N detector 123 configured to detect A/N for channel estimation.

The A/N detector 121 can detect NACK more accurately because A/N is detected using the detection criterion 1 set such that a false detection ratio of NACK would be lower than a false detection rate of ACK. Accordingly, retransmission control by the transmission/retransmission controller 122 successfully functions and the occurrence of retransmission in a layer upper than the layer 2 can be suppressed.

The A/N detector 123 can avoid the case that the false detection rate of ACK is increased with the detection criterion 1, because A/N is detected using the detection criterion 2 set such that a relative relationship between the false detection rate of ACK and the false detection rate of NACK would be different from that of the detection criterion 1. Thus, the accuracy of channel estimation by the channel estimation unit 124 is not decreased, and the demodulation performance for CQI by the CQI demodulator 125 can be maintained.

Also, in the case where data transmission control (specifically, adaptive modulation coding) is performed so that a packet error rate would be a specified value (for example, 10%), an occurrence rate of each of ACK and NACK is fixed. Thus, a relative relationship between the false detection rate of ACK and the false detection rate of NACK is set based on the occurrence rates of ACK and NACK, so that the false detection rates of both ACK and NACK can be lowered.

In the present embodiment, when the occurrence rate of ACK is higher than the occurrence rate of NACK, the detection criterion 2 is set such that the false detection rate of ACK would be lower than the false detection rate of NACK. In other words, ACK occurring at higher probability than that of NACK is accurately detected, so that a probability of failure in channel estimation can be decreased and the demodulation performance for CQI can be improved.

(6) Other Embodiments

As described above, the present invention has been described by using the above-described embodiment. However, it should not be understood that the description and the drawings, which constitute part of this disclosure, are to limit the present invention. Various alternative embodiments, examples, and operational techniques will be obvious for those skilled in the art from this disclosure.

For example, in the above-described embodiment, the description is mainly given to the format 2a. However, the present invention is applicable to a format 2b.

Also, illustrated in the above-described embodiment is the case where the present invention is applied to PUCCH being an uplink control channel. However, the present invention may be applied to PDCCH being a downlink channel if there is a case where A/N is multiplexed in a reference signal, or may be applied to a data channel.

Furthermore, the description is given in the above-described embodiment of the radio communication system 1 based on E-UTRA (3GPP Release 8). However, the present invention may be applied to LTE Advanced or the like which advances the 3GPP Release 8.

As described above, it should be understood that the present invention includes various embodiments not described herein. Accordingly, the present invention is only limited by the scope of claims and matters specifying the invention, which are appropriate from this disclosure.

Note that the entire content of Japanese Patent Application No. 2009-249319 (filed on Oct. 29, 2009) is incorporated herein by reference.

INDUSTRIAL APPLICABILITY

As described above, a radio communication apparatus and a radio communication method according to the invention are useful in radio communications such as mobile communications because an occurrence of delay by retransmission in an upper layer is suppressed and a demodulation performance for CQI can be maintained.

The invention claimed is:

1. A radio communication apparatus configured to receive a reference signal multiplexed with an acknowledgement or a negative acknowledgement from a radio communication counterpart, the acknowledgement indicating that data received by the radio communication counterpart is successfully decoded, the negative acknowledgement indicating that data received by the radio communication counterpart fails to be decoded, comprising:

a first detector configured to detect the acknowledgement or negative acknowledgement multiplexed in the reference signal using a first detection criterion set such that a false detection rate of the negative acknowledgement becomes lower than a false detection rate of the acknowledgement;

a second detector configured to detect the acknowledgement or negative acknowledgement multiplexed in the reference signal using a second detection criterion set such that a ratio of the false detection rate of the acknowledgement to the false detection rate of the negative acknowledgement of the second detection criterion is different from a ratio of the false detection rate of the acknowledgement to the false detection rate of the negative acknowledgement of the first detection criterion;

a retransmission controller configured to perform retransmission control of data to the radio communication counterpart according to a result of detection made by the first detector; and a channel estimation unit configured to estimate a channel characteristic with the radio communication counterpart using the reference signal from which the acknowledgement or negative acknowledgement is removed according to a result of detection made by the second detector.

2. The radio communication apparatus according to claim 1, wherein the second detection criterion is set such that the false detection rate of the acknowledgement and the false detection rate of the negative acknowledgement become equal to each other.

3. The radio communication apparatus according to claim 1, wherein, in the second detection criterion, the relative relationship between the false detection rate of the acknowledgement and the false detection rate of the negative acknowledgement is determined according to an occurrence rate of each of the acknowledgement and the negative acknowledgement.

4. The radio communication apparatus according to claim 3, wherein when the occurrence rate of the acknowledgement is higher than the occurrence rate of the negative acknowledgement, the second detection criterion is set such that the false detection rate of the acknowledgement becomes lower than the false detection rate of the negative acknowledgement.

5. The radio communication apparatus according to claim 3, further comprising a transmission controller to control transmission of data to the radio communication counterpart so that a probability of the radio communication counterpart failing to decode data becomes a specified value, wherein
the occurrence rate of each of the acknowledgement and negative acknowledgement is set according to the specified value.

6. A radio communication method comprising the steps of:
receiving a reference signal multiplexed with an acknowledgement or a negative acknowledgement from a radio communication counterpart, the acknowledgement indicating that data received by the radio communication counterpart is successfully decoded, the negative acknowledgement indicating that data received by the radio communication counterpart fails to be decoded;

detecting the acknowledgement or negative acknowledgement multiplexed in the reference signal using a first detection criterion set such that a false detection rate of the negative acknowledgement becomes lower than a false detection rate of the acknowledgement;

detecting the acknowledgement or negative acknowledgement multiplexed in the reference signal using a second detection criterion set such that a ratio of the false detection rate of the acknowledgement to the false detection rate of the negative acknowledgement of the second detection criterion is different from a ratio of the false detection rate of the acknowledgement to the false detection rate of the negative acknowledgement of the first detection criterion;

performing retransmission control of data to the radio communication counterpart according to a result of detection using the first detection criterion; and estimating a channel characteristic with the radio communication counterpart using the reference signal from which the acknowledgement or negative acknowledgement is removed according to a result of detection using the second detection criterion.

* * * * *